US010690522B2

(12) United States Patent
Schnore, Jr. et al.

(10) Patent No.: US 10,690,522 B2
(45) Date of Patent: Jun. 23, 2020

(54) IDENTIFICATION AND OTHER MEASURES ENCODED IN A THREADED SENSOR WELL

(71) Applicant: General Electric Company, Schenectady, NY (US)

(72) Inventors: Austars Raymond Schnore, Jr., Schenectady, NY (US); Stephen Zingelewicz, Scotia, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 0 days.

(21) Appl. No.: 16/173,858

(22) Filed: Oct. 29, 2018

(65) Prior Publication Data

US 2020/0132516 A1     Apr. 30, 2020

(51) Int. Cl.
*G01D 11/16*     (2006.01)
(52) U.S. Cl.
CPC .................................... *G01D 11/16* (2013.01)
(58) Field of Classification Search
CPC ..................................................... G01D 11/16
USPC .............................. 73/866.5, 761, 768, 432.1
See application file for complete search history.

(56) References Cited

U.S. PATENT DOCUMENTS

| 8,165,964 B2 | 4/2012 | Oertel |
| 8,705,873 B2 | 4/2014 | Voloshynovskiy et al. |
| 9,721,259 B2 | 8/2017 | Paul et al. |
| 2017/0039575 A1 | 2/2017 | Kang |
| 2019/0136679 A1* | 5/2019 | Orban ................... E21B 43/263 |

FOREIGN PATENT DOCUMENTS

| CN | 202067281 U | 12/2011 |
| CN | 103065244 A | 4/2013 |
| CN | 103927569 A | 7/2014 |

OTHER PUBLICATIONS

Wallstabe, Andreas, et al.; "Implementing High-level Counterfeit Security using RFID and PKI", 3rd European Workshop on RFID Systems and Technologies, pp. 1-5, 2007.

* cited by examiner

*Primary Examiner* — Nimeshkumar D Patel
*Assistant Examiner* — Jean F Morello
(74) *Attorney, Agent, or Firm* — Fletcher Yoder, P.C.

(57) ABSTRACT

The present disclosure relates to the use of a sensor well encoded in a structural, electrical, magnetic, or optical manner so as to provide the sensor well with a unique or otherwise distinctive fingerprint. In addition, a sensor configured to be positioned within the sensor well incorporates a sensing modality for reading or detecting the encoding of the sensor well.

19 Claims, 10 Drawing Sheets

IDENTIFICATION AND OTHER MEASURES ENCODED IN A THREADED SENSOR WELL

BACKGROUND

The subject matter disclosed herein relates to validating sensor placement in the context of a monitoring system.

Various types of sensors are often used in various industrial and commercial contexts to measure and monitor a process or environment of interest, such as the environment (e.g., temperature, pressure, pH) in which a controlled chemical reaction is occurring, the condition or status of equipment used in utility contexts (e.g., power generation, water treatment, and so forth), the environment within an engine or generator present in a vehicle (e.g., an airplane, boat, locomotive, bus, or automobile), and so forth.

In these contexts, the sensor typically conveys the data acquired pertaining to the monitored parameters of interest, but does not or cannot convey information that validates location and/or performance of the sensor or other data validating the sensor. By way of example, a temperature sensor may convey temperature data, but it must typically be assumed that the sensor is in the proper location, that the sensor is in proper working order, and/or that the sensor has not been tampered with or replaced with an improper or unsuitable part.

Thus, reliance on the sensor may be based in part on assumptions that may or may not be warranted and that may prove problematic if incorrect.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a sensor is provided. In accordance with this embodiment, the sensor comprises: a sensor body configured to be positioned in a sensor well; a first sensing modality configured to sense a parameter of interest in a monitored environment; and a second sensing modality configured to sense one or more encoded parameters of the sensor well when the sensor body is positioned within the sensor well.

In a further embodiment, a sensor well is provided. In accordance with this embodiment, the sensor well comprises: one or more engagement structures formed in a surface of the sensor well, wherein the engagement structures are configured to engage corresponding structures of a sensor; and one or more identification structures formed on one or both of the surface of the sensor well or the engagement structures, wherein the one or more identification structures are configured to be sensed by a sensing modality of the sensor when the sensor is present in the sensor well.

In an additional embodiment, a method is provided for monitoring an environment. In accordance with this method, operational data indicative of a parameter of interest within the environment is acquired using a first sensing modality of a sensor positioned in a sensor well formed in a structure containing or surrounding the environment. Sensor well data is acquired using a second sensing modality of the sensor. The sensor well data is indicative of one or both of an identification of the sensor well or a position of the sensor within the sensor well. The operational data and the sensor well data are transmitted to one or more control systems. A reaction or operation is monitored or controlled based on the operational data. One or both of the presence or position of the sensor within the sensor well are validated based on the sensor well data.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed herein, the present approach relates to acquiring data that may be used to validate or verify the nature of a placed sensor, the placement of such a sensor in an intended location, and/or that such a sensor has not been tampered with or otherwise manipulated. Thus, the present approach may have application in the context of security (e.g., cybersecurity, anti-tamper), part verification and management (e.g., trusted part standards and implementation), and supply chain management (e.g., part tracking). The examples herein generally relate to the context of sensors configured to be deployed in a sensor well, such as a threaded sensor well. However, it should be appreciated that other sensor and sensor deployment environments may also benefit from the present approach, and thus are encompassed by the present disclosure. Thus, the present sensor/sensor well examples should be understood as providing a useful, real world example and context, but not as limiting the scope of the present teachings. Indeed, any sensor configured to sense placement data encoded in the environment in which the sensor is deployed may benefit from the present approach. Nevertheless, to facilitate explanation certain examples are provided herein in which the sensor is a threaded sensor configured to be fitted into a threaded sensor well that is encoded with data that may be sensed by the sensor in addition to the primary data (e.g., temperature, pressure, pH, humidity, electrical parameters) collected by the sensor.

Figure 1:
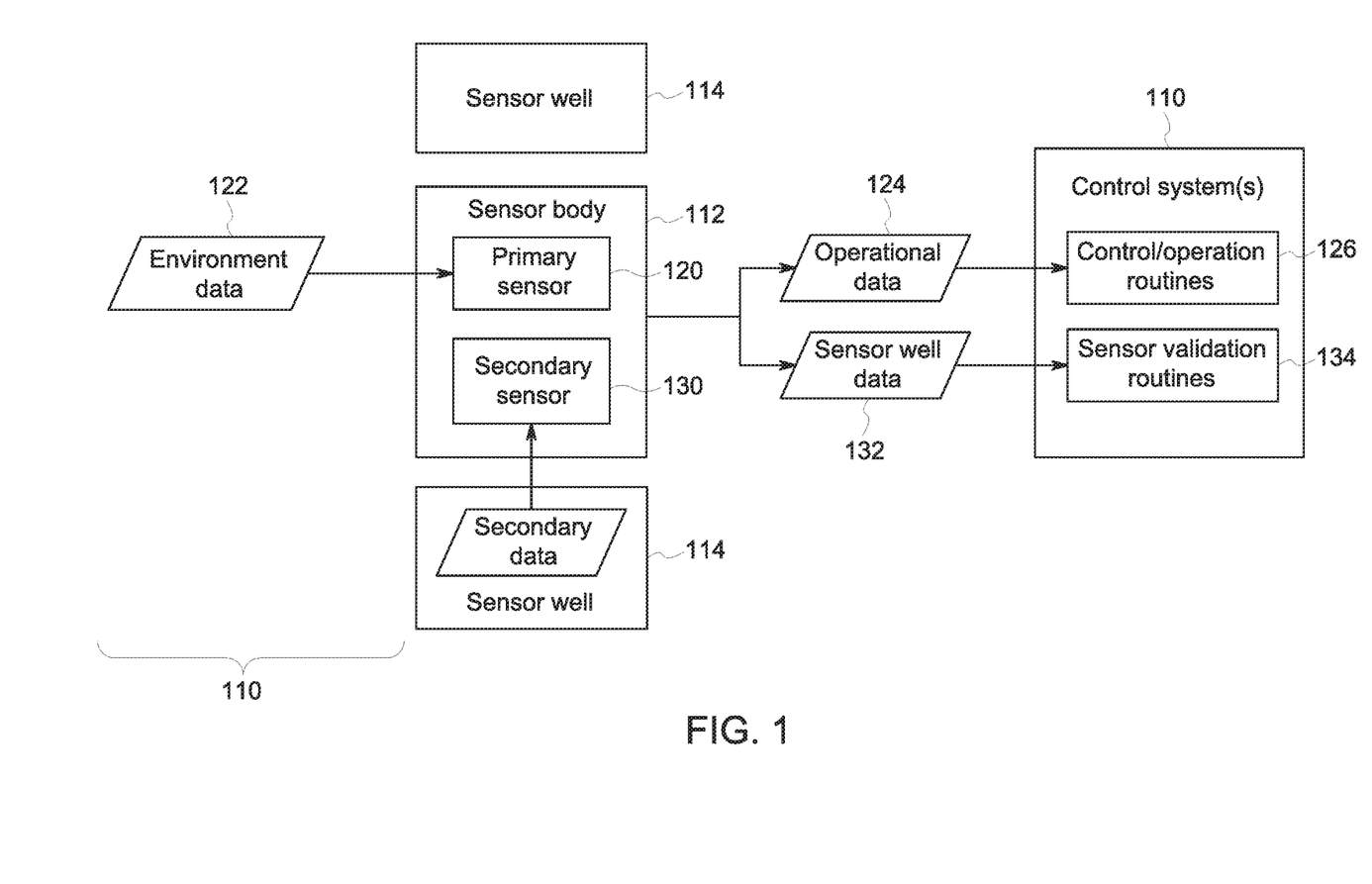
FIG. 1 is a box diagram depicting components of a sensing and control system and the generation and flow of data within the system, in accordance with aspects of the present disclosure. In accordance with certain embodiments, the sensor and/or sensor placement may be validated and, further, potentially providing an anti-tamper aspect, such as providing information as to whether the sensor has been removed and reinserted.

With this in mind, and turning to FIG. 1, a flow diagram is provided illustrating certain of the present concepts. In this example, a generalized sensed environment 100 and control system 110 is illustrated in which a sensor body 112 (e.g., a threaded sensor body) is disposed within a sensor well 114 (e.g., a threaded sensor well) which may be in a wall of a vessel or chamber in which condition are to be monitored (e.g., a chemical reaction vessel, a generator or engine wall, and so forth). In this manner, a primary sensing surface of the sensor body 112 may interface with the environment to be monitored or sensed while securing the sensor body 112 and maintained a sealed or closed environment. The control system 110, based on data acquired by the sensors on the sensor body 112, may adjust or control a reaction or event occurring in the environment 110 or, as needed, events upstream or downstream of the monitored environment 110.

Thus, in this example, the sensor body 112 includes a primary sensor 120 configured to measure or monitor a parameter of interest (here illustrated as environment data 122) in the monitored environment 110 (e.g., temperature, pressure, pH, humidity, current, voltage, and so forth). In the depicted example, the primary sensor 120 communicates the data acquired to the controller or control system 110, such as via a wired connection (e.g., an electrical or optical transmission line) or a wireless connection). By way of example, this data may be characterized as operational data 124 which is communicated to one or more control or operation routines 126 implemented by or executed on the control system 110 to control or adjust an operating condition or parameter upstream, downstream, or in the environment 110. Communication between the primary sensor 120 and control system 110 may be encrypted or otherwise secured to help safeguard the integrity of the sensed operational data 124 and prevent corruption or manipulation of the operational data 124.

As may be appreciated however, while encryption or securing communication between the primary sensor 120 and control system 110 may protect the integrity of the communications in transit, it does not actually assure that the sensor body 112 is properly position or placed or is even monitoring the intended environment 110. Likewise, it does not confirm that the sensor body 112 or primary sensor 120 has not been tampered with.

With this in mind, in accordance with the present approach the sensor body 112 incorporates a secondary sensor 130 that senses data related to the placement or position of the sensor body 112 and which may be used to verify placement or position of the sensor body 112 and/or monitored for indications of tampering with the sensor body 112. In the illustrated example, the secondary sensor 130 may sense data (here depicted as secondary data) encoded into the sensor well (e.g., threaded sensor well) in which the sensor body 112 is placed. The secondary sensor 130 may communicate the data acquired to the controller or control system 110 (or a separate system employed for monitoring sensor placement or tampering), such as via a wired connection (e.g., an electrical or optical transmission line) or a wireless connection). By way of example, this data may be characterized as sensor well data 132 which is communicated to one or more sensor validation routines 134 implemented by or executed on the control system 110 (or an alternative validation system) to verify sensor body 112 placement, monitor the sensor well data for evidence of tampering or other irregularities, and/or to otherwise log the data for future comparison and reference. As with the operational data 124, communication of the sensor well data 132 may be encrypted or otherwise secured to help safeguard the integrity of the sensor well data 132 and prevent corruption or manipulation of the sensor well data 132.

Thus, in accordance with this approach, the sensor body 112 incorporates a secondary sensor 130 configured to generate data indicative of the placement of the sensor body 112. Correspondingly, the sensor well 114 is provided with distinctive features capable of being sensed by the secondary sensor 130 and that may be used to distinguish the sensor well 114 from other locations (e.g., a sensor well "fingerprint") and/or to otherwise verify placement of the sensor body 112 in a given sensor well based on the sensed sensor well data 132.

By way of example, the sensor well 114 may be manufactured to have distinctive features using an additive manufacturing process. As used herein, additive manufacturing (AM) processes generally involve the buildup of one or more materials to make a net or near-net shape object, such as a reactor, engine, or generator chamber or wall having a sensor well 114, and may be contrasted with subtractive manufacturing methods. Though "additive manufacturing" is an industry standard term (ASTM F2792), it encompasses various manufacturing and prototyping techniques known under a variety of names, including freeform fabrication, 3D printing, rapid prototyping/tooling, etc. Certain additive manufacturing process uses a focused energy source (e.g., an electron beam, a laser beam) to sinter or melt a powder material deposited on a build platform within a chamber, creating a solid three-dimensional object in which particles of the powder material are bonded together.

In such an additive manufacturing implementation, the fabricated sensor well 114 may be a threaded sensor well additively manufactured to include notches, grooves, variations in groove depth or thickness, or other structurally distinctive features that may be sensed by the secondary sensor 130 of an inserted sensor body 112. Similarly, such an additive manufacturing process may be used to manufacture a sensor well 114 (including a threaded sensor well) in which the composition of the sensor well 114 varies at different locations in a manner that may be sensed, such as varying composition at different locations to introduce detectable variations in conductivity (or other electrical properties), chemical properties, magnetic properties, radioactive properties, and/or optical properties such that a corresponding secondary sensor 130 can detect the distinctive variations in composition to identify a given sensor well 114.

Alternatively, other techniques may be employed to fabricate or otherwise form a sensor well 114 having distinctive features than can be sensed by a secondary sensor. For example, a conventionally fabricated threaded sensor well 114 may have a pattern of grooves cut perpendicular to the threads using mechanical or laser cutting mechanisms. The pattern of grooves may be cut so as to be distinctive to one or a limited number of sensor wells 114. Similarly, such grooved threads in a sensor well 114 may be fabricated using additive manufacturing techniques.

In such implementations, the secondary sensor 130 may be conduction sensors or other sensors capable of detecting the notches or grooves in an otherwise continuous thread. Based on the detected notching relative to the sensor body 112, the sensor well data 132 generated by the secondary sensor (e.g., conduction sensors) may be used to identify the sensor well 114 in which the sensor body 112 is engaged and may also be used to determine whether the sensor body 112 has been moved or manipulated relative to the sensor well 114 by reference to a prior measurement. That is, the sensor well data 132 may also be used, over time, to determine whether the sensor has been moved or adjusted within a given sensor well 114. As may be appreciated, in certain embodiments, a tolerance factor or range may be employed in comparing measurements over time so as to reduce or minimize false positives attributable to an error range associated with a given sensor, natural shifts or movement attributable to a given production or working environment, and so forth.

Figure 2:
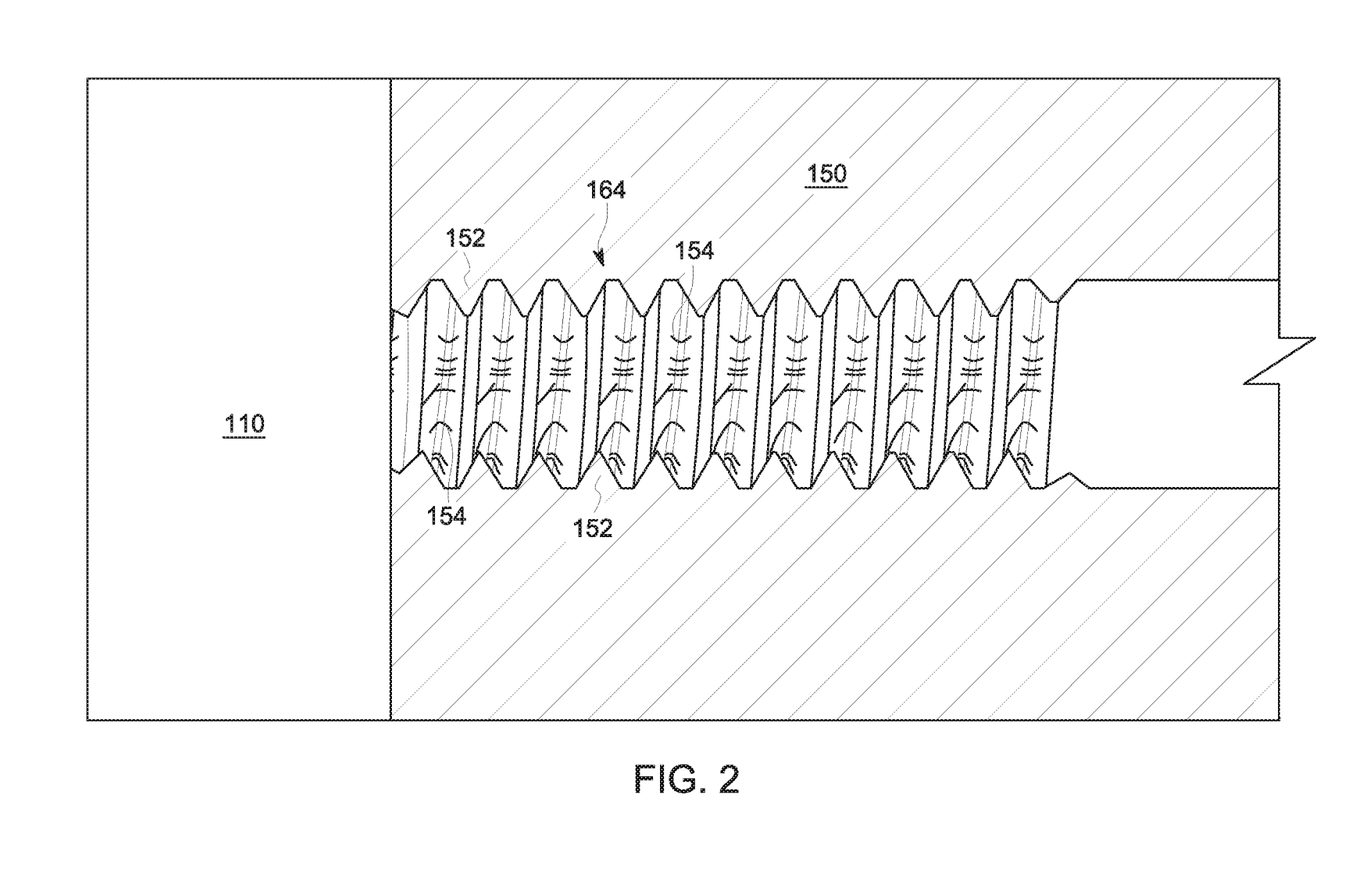
FIG. 2 depicts a cut-away side-view of a sensor well having grooved threads, in accordance with aspects of the present disclosure.
Figure 3:
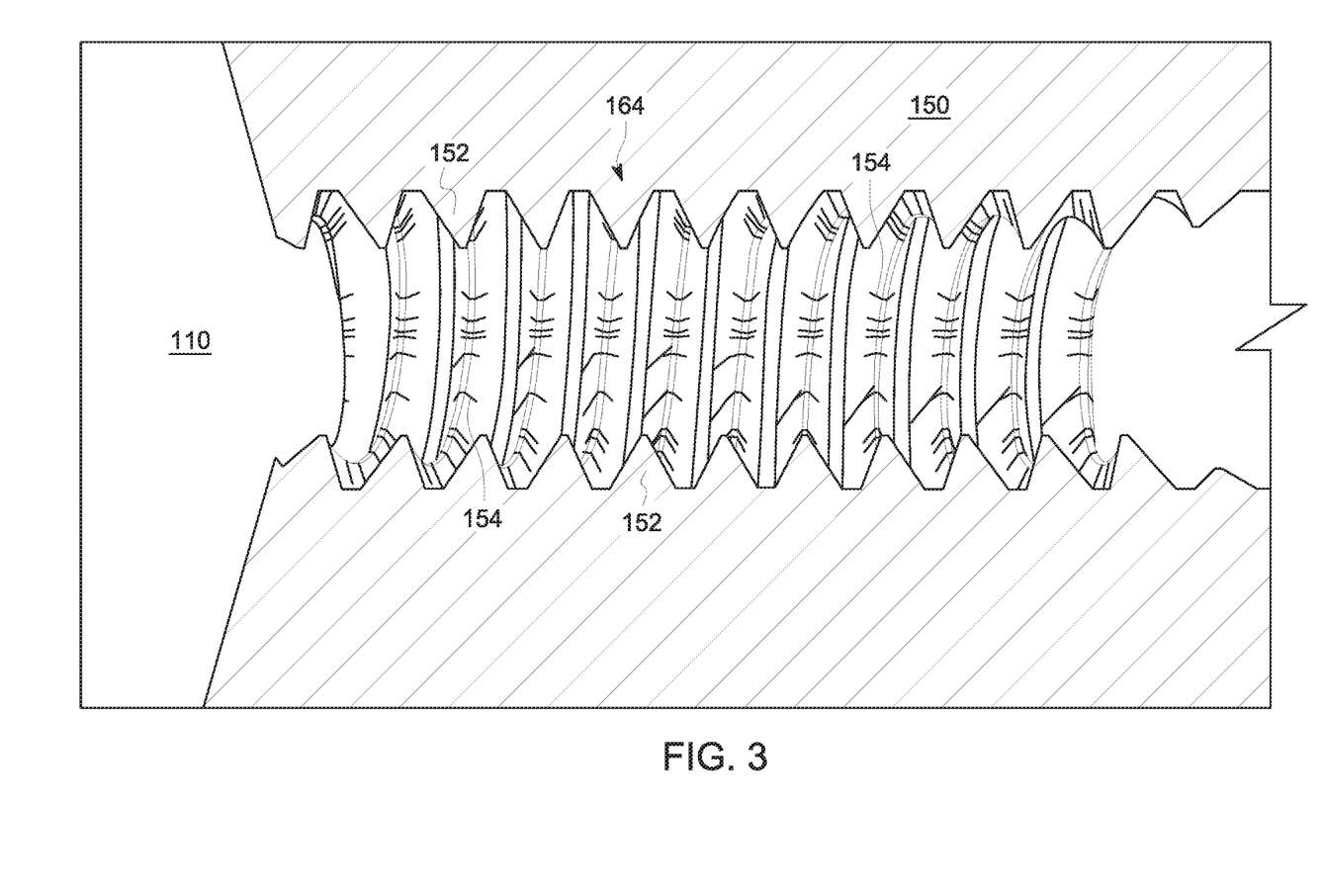
FIG. 3 depicts a cut-away perspective view of a sensor well having grooved threads, in accordance with aspects of the present disclosure.

By way of further illustration, FIGS. 2 and 3 illustrate sectional views taken from a side (FIG. 2) and perspective (FIG. 3) showing a threaded sensor well 164 formed in a wall 150 of a contained and monitored environment 110 (e.g., a reaction, chamber, engine, generator, and so forth). In the depicted example, the wall thread 152 of the threaded sensor well 164 has grooves 154 formed in the direction of the longitudinal axis of the threaded sensor well 164 (i.e., substantially parallel to the wall threads 152). As noted above, the pattern of grooves 154 may be formed during manufacture (such as using additive manufacturing techniques, laser cutting, or machining) or after manufacture (such as using laser cutting or machining).

Figure 4:
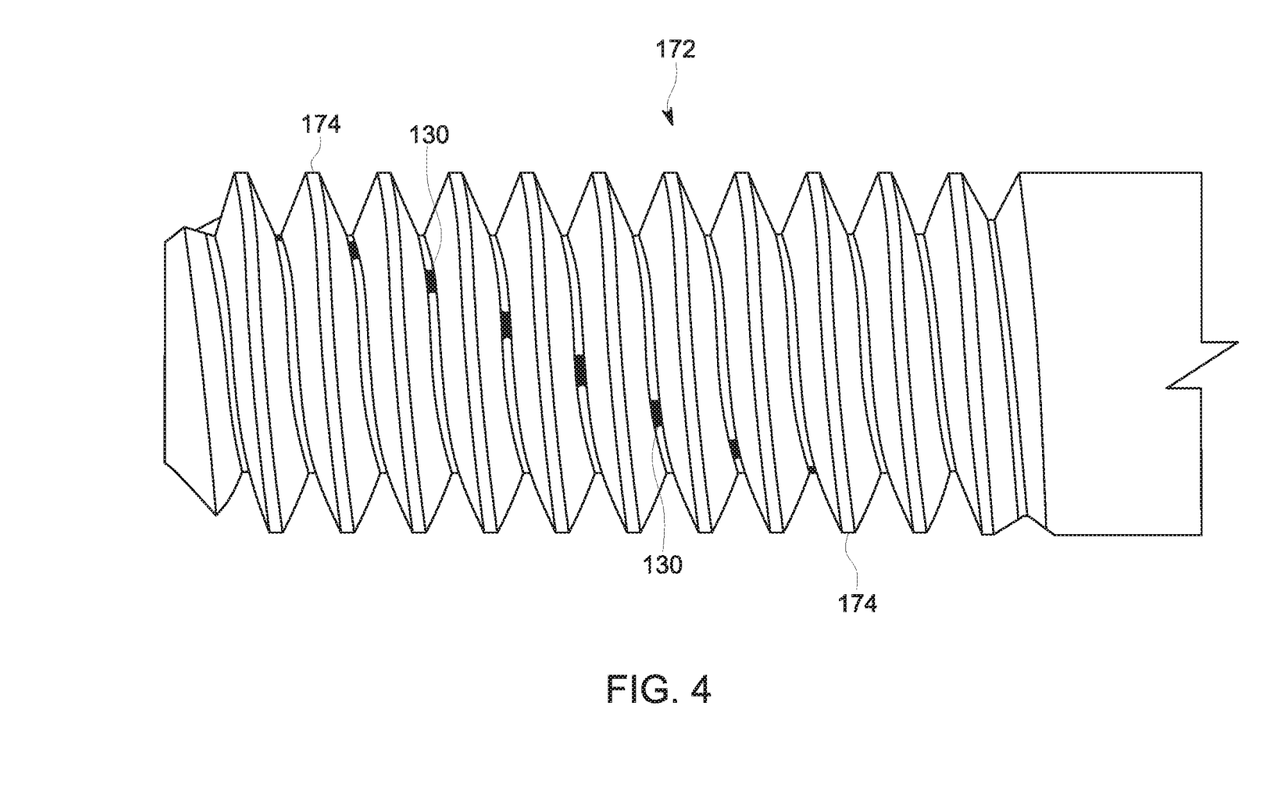
FIG. 4 depicts a side-view of a sensor that incorporates secondary sensors, in accordance with aspects of the present disclosure.
Figure 5:
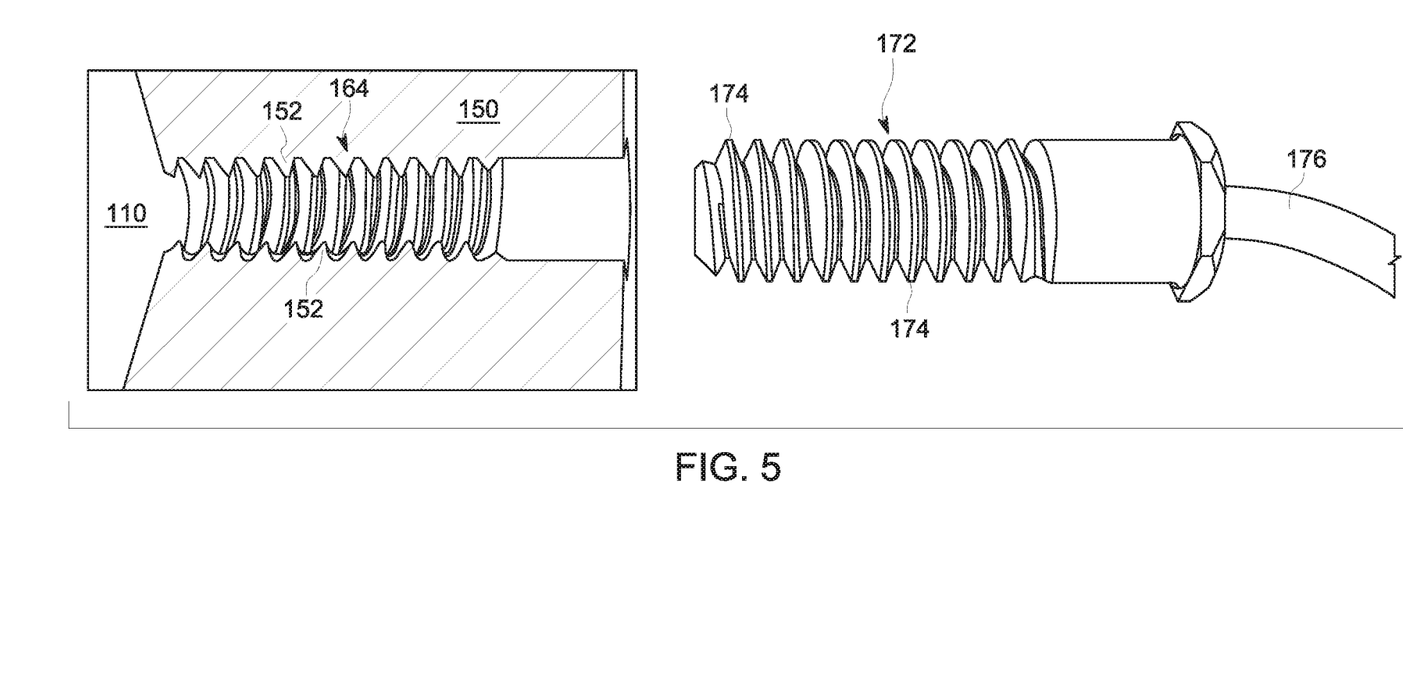
FIG. 5 depicts a cut-away view of the sensor of FIG. 4 within the sensor well of FIG. 2, in accordance with aspects of the present disclosure.
Figure 6:
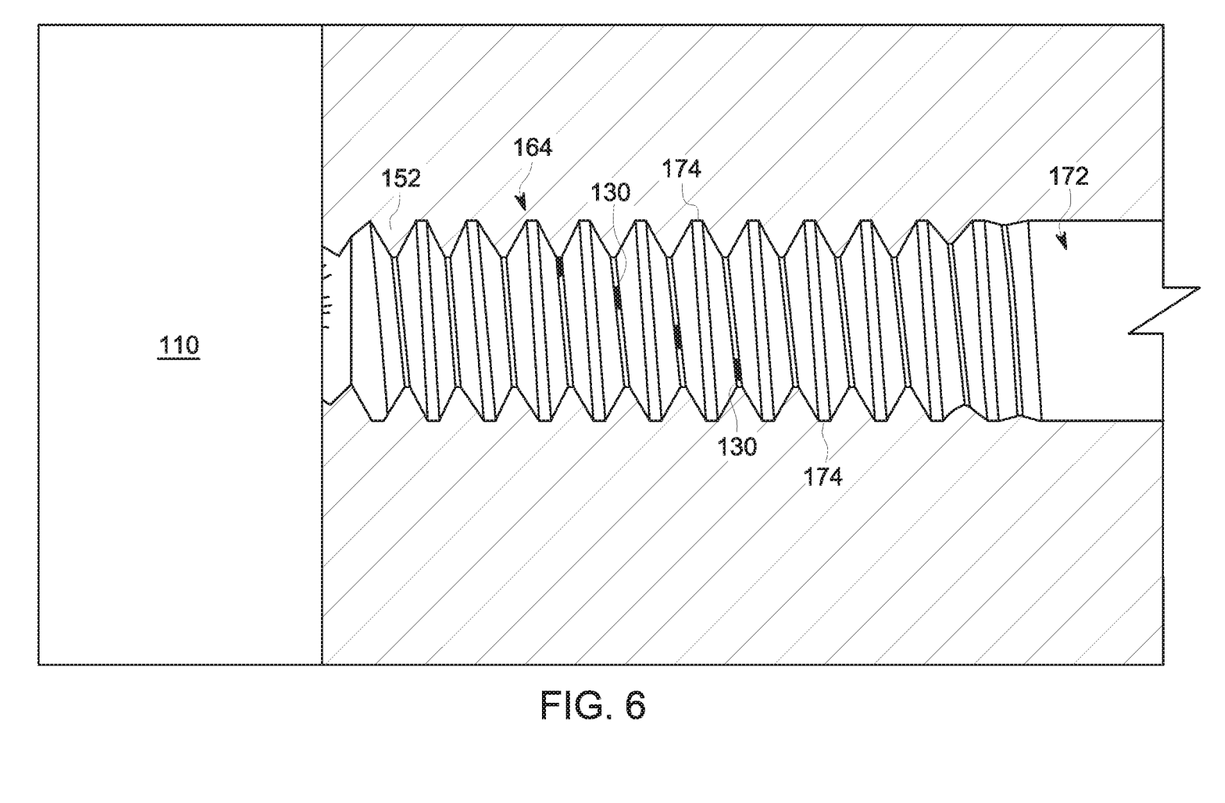
FIG. 6 depicts a cut-away side-view of a sensor well having grooved threads shown in conjunction with secondary sensors of a complementary sensor, with the body of the sensor not shown to facilitate visualization, in accordance with aspects of the present disclosure.
Figure 7:
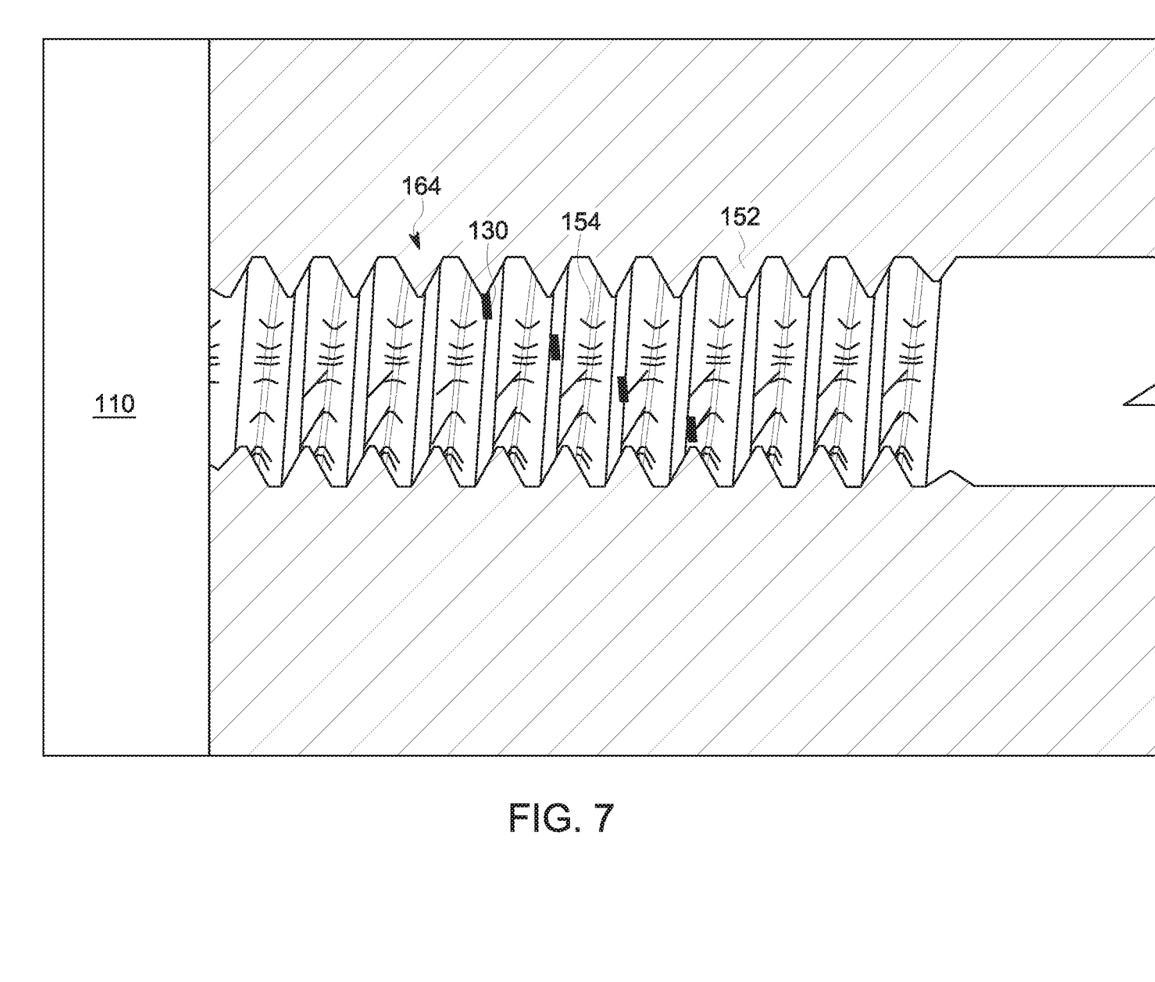
FIG. 7 depicts a cut-away side-view of a sensor well having grooved threads shown in conjunction with secondary sensors of a complementary sensor, with the body of the sensor not shown to facilitate visualization, in accordance with aspects of the present disclosure.
Figure 8:
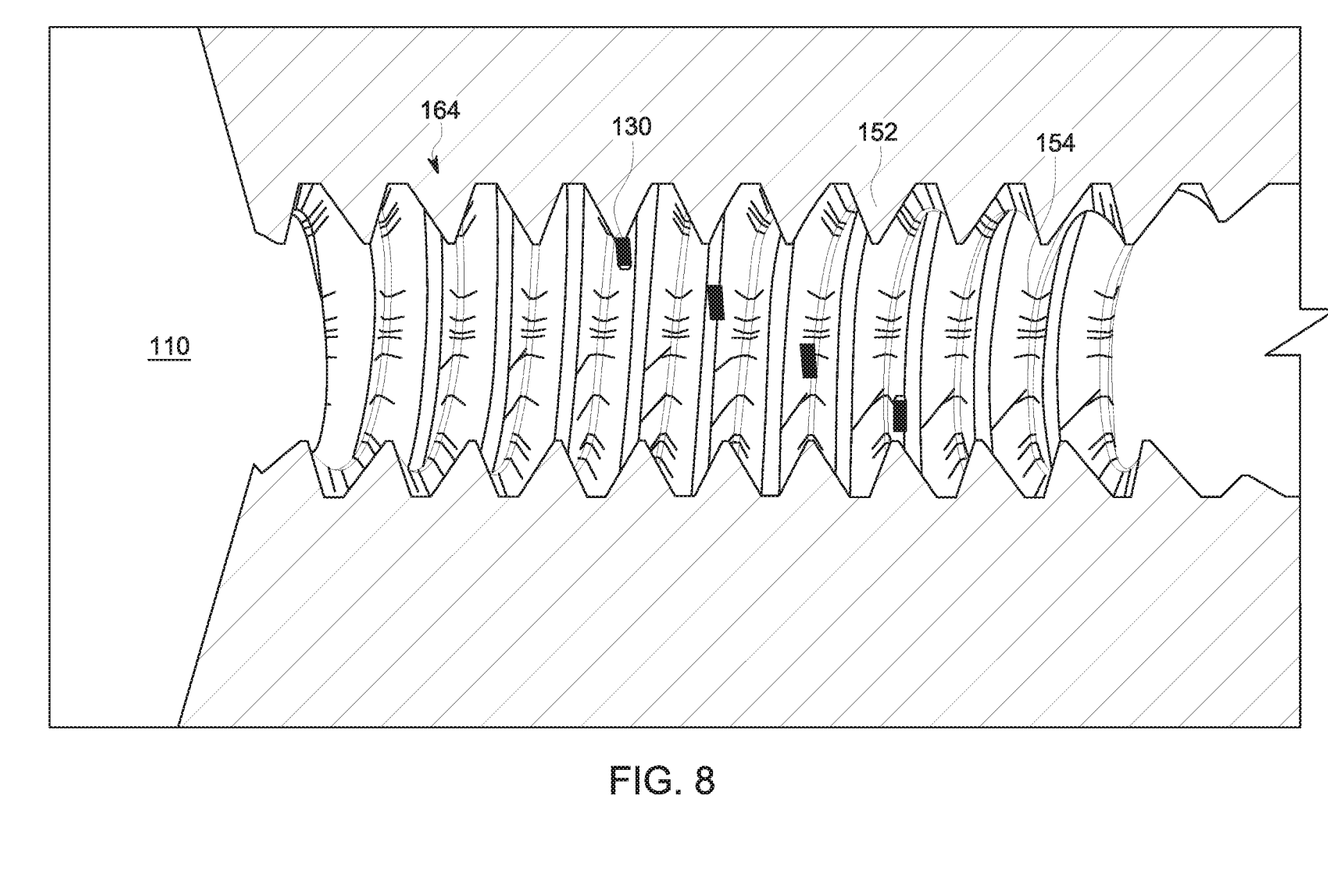
FIG. 8 depicts a cut-away perspective-view of a sensor well having grooved threads shown in conjunction with secondary sensors of a complementary sensor, with the body of the sensor not shown to facilitate visualization, in accordance with aspects of the present disclosure.
Figure 9:
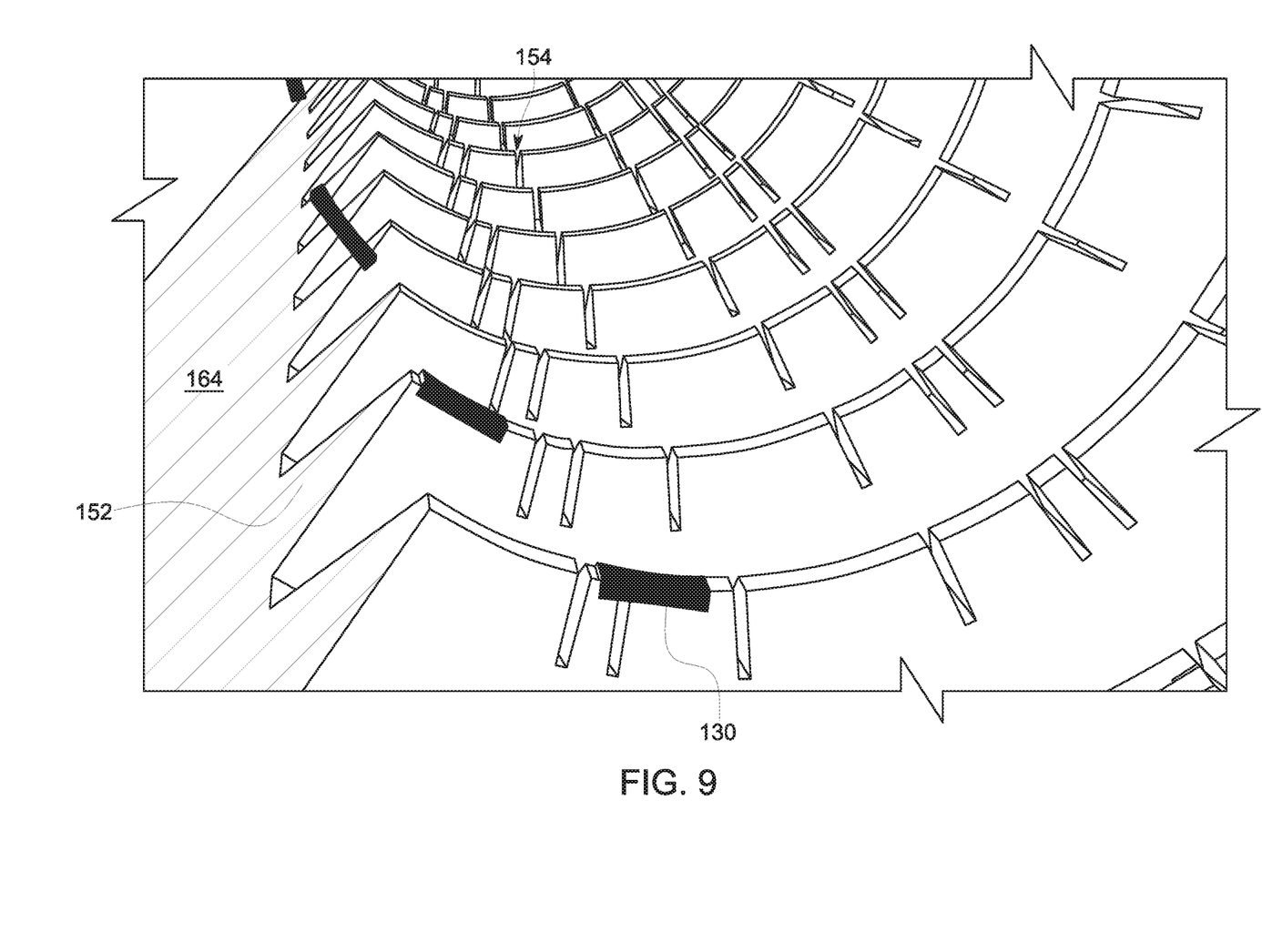
FIG. 9 depicts a cut-away perspective-view of a sensor well having grooved threads shown in conjunction with secondary sensors of a complementary sensor, with the body of the sensor not shown to facilitate visualization, in accordance with aspects of the present disclosure.
Figure 10:
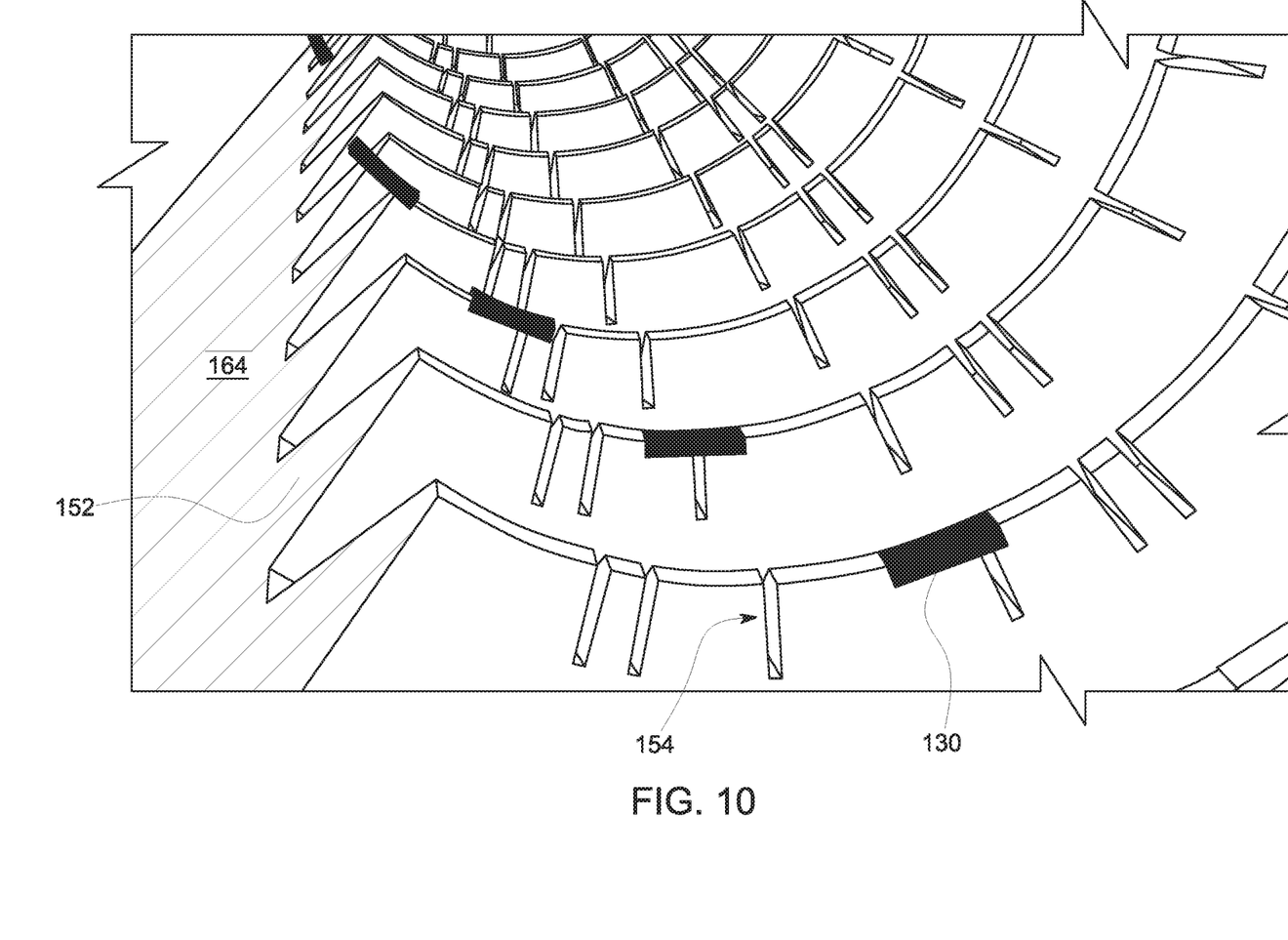
FIG. 10 depicts a further cut-away perspective-view of a sensor well having grooved threads shown in conjunction with secondary sensors of a complementary sensor, with the body of the sensor not shown to facilitate visualization, in accordance with aspects of the present disclosure.

Turning to FIGS. 4-6, a threaded sensor 172 is depicted both alone (FIG. 4), prior to insertion into a threaded sensor well 164 (FIG. 5, showing the fiber optic or electrical sensor connection 176), and positioned within a cut-away view of the threaded sensor well 164 (FIG. 6). In the depicted examples, the threaded sensor 172 incorporates between the sensor thread 174 at various locations secondary sensors 130 that are capable of detecting grooves 154 or notches (or the overall pattern of grooves) in the wall thread 152 (or other distinctive chemical, structural, magnetic, electric, optical, or radioactive properties of the wall thread 152) so that the secondary sensors 130 generate distinctive sensor well data 132 indicate of the sensor well 114 in which the sensor body 112 is placed and, in some implementations, of the relative position of the sensor body 112 within the sensor well 114 at a given time.

To better illustrate this aspect, FIGS. 7-10 depict various views of a threaded sensor well 164 having grooves 154 formed within the wall thread 152 in conjunction with secondary sensors 130 shown abstracted from the respective threaded sensor 172 so as to facilitate visualization of how the secondary sensors 130 interface with the grooves 154 when in use (e.g., how the secondary sensors 130 may be positioned with respect to various grooves 154 in use). In this manner, the aggregation of the data acquired by the secondary sensors 130 (e.g., conduction sensors or other sensors suitable for detecting the pattern of grooves 154) may be used to identify a given sensor well, but also the relative placement of the threaded sensor 172 within the threaded sensor well 164 and whether that relative placement has changed over a time interval outside of an established tolerance.

While grooved wall threads 152 in coordination with sensors (e.g., conduction sensors) capable of detecting such grooves 154 and assembling a fingerprint of a sensor well are described above, it may be appreciated that other implementations of the present approach may be employed. For example, in one embodiment the fiber optic or electrical transmission lines 176 (e.g., as a third sensor type) may be employed in conjunction with the present approach to allow capture of not only sensor well and sensor identification, as discussed herein, by also allowing part health to be monitored and/or to monitor if a primary sensor is tampered with. For example, health monitoring in this context may be based on a sensed indication that a hole has been bored into the machine body next to the sensor well 164 (or that the sensor well has been cut out of the machine body) in order to effect the measurements made by the primary sensor 120 of the sensed environment. In such a circumstance, the fiber and the electrical transmission lines may be used to sense such tampering and to provoke a suitable response to the knowledge that the sensed data is compromised.

Technical effects of the invention include the acquisition of data to validate or verify the nature of a placed sensor, the placement of such a sensor in an intended location, and/or that such a sensor has not been tampered with or otherwise manipulated. In certain embodiment, a sensor well is provided that is encoded in a structural, electrical, magnetic, or optical manner so as to provide the sensor well with a unique or otherwise distinctive fingerprint. In addition, a sensor configured to be positioned within the sensor well incorporates a primary sensing modality for measuring a parameter of interest in an environment on one side of a wall incorporating the sensor well and a secondary sensing modality for reading or detecting the encoding of the sensor well. In this manner, data acquired by the second sensing modality may be used to validate or verify the sensor well in which the sensor is positioned. In some embodiments, the data acquired by the secondary sensing modality may be logged or monitored over time for changes to provide an indication of manipulation or tampering with respect to the sensor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A sensor, comprising:
   a threaded sensor body configured to be positioned in a threaded sensor well;
   a first sensing modality configured to sense a parameter of interest in a monitored environment; and
   a second sensing modality configured to sense one or more encoded parameters of the threaded sensor well when the threaded sensor body is positioned within the threaded sensor well.

2. The sensor of claim 1, wherein the threaded sensor body is configured to have a complementary engagement with the threaded sensor well.

3. The sensor of claim 1, wherein the second sensing modality comprises a conductance sensing modality configured to detect a pattern of grooves formed in a thread of the threaded sensor well.

4. The sensor of claim 1, wherein the second sensing modality is configured to sense one or more of electrical properties, radioactive properties, chemical properties, magnetic properties, optical properties, or structural properties of the threaded sensor well.

5. The sensor of claim 1, wherein the sensor is configured to transmit data from one or both of the first sensing modality or the second sensing modality to one or more control systems in communication with the sensor.

6. The sensor of claim 1, wherein the first sensing modality comprises one or more of a temperature sensor, a pressure sensor, a pH sensor, a humidity sensor, or an electrical sensor configured to measure one or more electrical parameters.

7. The sensor of claim 1, wherein the threaded sensor well is formed in a wall of a reaction vessel, engine, or generator.

8. A sensor well, comprising:
   one or more engagement structures formed in a surface of the sensor well, wherein the engagement structures are configured to physically engage corresponding structures of a sensor; and
   one or more identification structures formed on one or both of the surface of the sensor well or the engagement structures, wherein the one or more identification structures are configured to be sensed by a sensing modality of the sensor when the sensor is present in the sensor well.

9. The sensor well of claim 8, wherein the one or more engagement structures comprise an engagement thread formed on the surface of the sensor well and configured to engage a corresponding thread of the sensor.

10. The sensor well of claim 8, wherein the sensor well is formed in a wall of a reaction vessel, engine, or generator.

11. The sensor well of claim 8, wherein the one or more identification structures comprise grooves or notches formed in an engagement thread formed radially about the surface of the sensor well.

12. The sensor well of claim 8, wherein the grooves or notches are formed in a direction parallel to a longitudinal axis of the sensor well.

13. The sensor well of claim 8, wherein the one or more identification structures comprise variations in the structure, magnetic properties, radioactive properties, chemical properties, electrical properties, or optical properties of the surface of the sensor well or the one or more engagement structures, such that the sensor well is distinguishable based on the identification structures.

14. A method for monitoring an environment, comprising:
   acquiring operational data indicative of a parameter of interest within the environment using a first sensing modality of a sensor positioned in a sensor well formed in a structure containing or surrounding the environment;
   acquiring verification information of a thread of the sensor well using a second sensing modality of the sensor, wherein the verification information is indicative of one or both of an identification of the sensor well or a position of the sensor within the sensor well;
   transmitting the operational data and the verification information to one or more control systems;
   monitoring or controlling a reaction or operation based on the operational data; and
   validating one or both of the presence or position of the sensor within the sensor well based on the Censor well data verification information.

15. The method of claim 14, wherein acquiring the verification information comprises detecting a pattern of grooves within the thread of the sensor well.

16. The method of claim 15, wherein the pattern of grooves are detected using a conduction sensing modality.

17. The method of claim 15, wherein acquiring the verification information comprises detecting one or more variations in the structure, magnetic properties, radioactive properties, chemical properties, electrical properties, or optical properties of the sensor well, such that the sensor well is distinguishable based on the one or more variations.

18. The method of claim 15, further comprising:
   identifying one or more instances in which the sensor is manipulated within the sensor well or removed from the sensor well based upon monitoring the verification information over time.

19. The method of claim 1, wherein the parameter of interest within the environment comprises one or more of a temperature, a pressure, a pH, a humidity, or an electrical parameter.

* * * * *